(12) United States Patent
Bossler et al.

(10) Patent No.: US 7,468,967 B2
(45) Date of Patent: Dec. 23, 2008

(54) SYSTEM AND METHOD FOR TRANSMISSION OF LOW RATE DATA

(75) Inventors: Daniel Bruce Bossler, Chandler, AZ (US); Scott David Blanchard, Mesa, AZ (US)

(73) Assignee: General Dynamics C4 Systems, Inc., Scottsdale, AZ (US)

( * ) Notice: Subject to any disclaimer, the term of this patent is extended or adjusted under 35 U.S.C. 154(b) by 639 days.

(21) Appl. No.: 11/117,883

(22) Filed: Apr. 29, 2005

(65) Prior Publication Data

US 2006/0245455 A1 Nov. 2, 2006

(51) Int. Cl.
*H04B 7/216* (2006.01)
(52) U.S. Cl. .................... 370/335; 370/479
(58) Field of Classification Search .......... 370/335, 370/342, 441, 479; 375/130
See application file for complete search history.

(56) References Cited

U.S. PATENT DOCUMENTS

| | | | |
|---|---|---|---|
| 6,618,429 B2 | 9/2003 | Gilhousen et al. | |
| 6,628,634 B2* | 9/2003 | Palenius | 370/335 |
| 6,799,053 B2* | 9/2004 | Miyoshi et al. | 455/522 |
| 7,227,854 B2* | 6/2007 | Kim et al. | 370/342 |
| 7,236,480 B2* | 6/2007 | Iancu | 370/335 |
| 2002/0097697 A1* | 7/2002 | Bae et al. | 370/335 |
| 2003/0206631 A1* | 11/2003 | Candelore | 380/210 |
| 2005/0265292 A1* | 12/2005 | Atsuta | 370/335 |
| 2006/0218473 A1* | 9/2006 | Kikuchi et al. | 714/776 |
| 2008/0043683 A1* | 2/2008 | Kwon et al. | 370/335 |

OTHER PUBLICATIONS

Physical Layer Standard for cdma2000 Spread Spectrum Systems, Release C, 3rd Generation Partnership Project 2 "3GPP2", 3GPP2 C.S0002-C, Version 1.0, May 28, 2002, pp. 3-18, 3-23, 3-107 and 3-108.
Recommendation ITU-R M.1457-1, Detailed specifications of the radio interfaces of International Mobile Telecommunications-2000 (IMT-2000), 2000-2001, p. 149-158.

* cited by examiner

*Primary Examiner*—Ricky Ngo
*Assistant Examiner*—Kan Yuen
(74) *Attorney, Agent, or Firm*—Ingrassia Fisher & Lorenz, P.C.

(57) ABSTRACT

Systems and methods are provided for signaling control information in a communication of data. The method includes overwriting a portion of a frame in a sequence of frames with control information. The control information has a low bit size, and the overwriting is performed at a frequency of less than about 20% of the frames. The system includes a spread spectrum transmitter that includes a channel coder, an interleaver and framer unit, and an insertion unit. The insertion unit is configured to overwrite a portion of a frame in a sequence of frames with control information and is further configured to overwrite at a frequency of less than about 20% of the frames.

9 Claims, 3 Drawing Sheets

SYSTEM AND METHOD FOR TRANSMISSION OF LOW RATE DATA

GOVERNMENT LICENSE RIGHTS

The U.S. Government may have certain rights to some or all of the inventive subject matter of the present application as provided for by the terms of contract No. N00039-02-C-3295 awarded by the Department of Defense (U.S. Navy).

FIELD OF THE INVENTION

The present invention generally relates to spread spectrum communication, and more particularly relates to communicating low rate data in a spread spectrum communication.

BACKGROUND OF THE INVENTION

Wireless communication systems have been implemented in numerous applications such as worldwide television, communication to remote areas, wide area data networks, global personal communications to hand-held portable telephones, broadband voice, video, and data. As the number of applications has increased and the number of users using the applications has increased, processes have been developed to accommodate these increased applications and users. One such process that has been developed is multiplexing.

In multiplexing, multiple signals may be transmitted on a single channel, and many forms of multiplexing have been developed to generate a multiplexed communication signal, including, but not limited to time multiplexing, frequency multiplexing, space multiplexing (e.g., Frequency-Division Multiplexing (FDM), Time-Division Multiplexing (TDM), Space-Division Multiplexing (SDM), Orthogonal Frequency Multiplexing (OFM), Code-Division Multiple Access (CDMA) multiplexing, Wideband CDMA (WCDMA) multiplexing, Time-Division Multiple Access multiplexing, Orthogonal Frequency Multiple Access (OFMA) multiplexing, and Frequency Division Multiple Access multiplexing (FDMA)).

CDMA refers to a form of multiplexing that allows numerous signals to occupy a single transmission channel thereby optimizing the use of available bandwidth. CDMA employs analog-to-digital conversion in combination with spread spectrum signal processing whereby a multiplier combines an information signal, such as speech, with a high-rate digital spreading code. At a transmitter (e.g., a cellular base station), an analog-to-digital converter digitizes the information signal for transmission at a predetermined data rate, and a multiplier varies the digitized signal according to a defined pattern or code. In addition, the transmitter typically performs additional signal processing, such as speech encoding, channel encoding, interleaving, and framing of the digitized signal, prior to transmission. The resulting transmission signal has a relatively wide band with a bandwidth of the spreading code.

Communication systems may at times transmit physical layer control data. For example, in many conventional communication systems using CDMA, a base station transmits a power control message to a mobile communication unit (e.g., cellular phone) to regulate the power output of the cellular phone during communication. In a satellite WCDMA communication system, a framer organizes a transmission into a sequence of frames, and the frames are divided into time slots. For a forward link, each time slot carries a Dedicated Physical Data Channel (DPDCH) and a corresponding Dedicated Physical Control Channel (DPCCH), and the DPCCH carries a power control field and a frame control header that indicates the DPDCH format and data rate. The power control field has two bits that indicate an increase power command or a decrease power command, and the power control field and frame control header are coded together and mapped to a fifteen (15) bit sequence belonging to a family of thirty-two (32) sequences.

For forward traffic communication, a conventional CDMA 2000 communication system periodically overwrites or "punctures" a power control bit into known power control groups (e.g., pre-determined positions within a frame) after interleaving. A "Ø" bit indicates an increase in mean output power level, and a "1" bit indicates a decrease in mean output power level. Upon consideration of the frequency of frames transmitted per second, conventional CDMA 2000 and WCDMA communication systems both dedicate a significant portion of communication bandwidth to the transmission of power control information.

Terrestrial-based communication systems using CDMA 2000 or wideband CDMA typically have relatively fast roundtrip times for communication signals to travel between the base station and the mobile communication unit. The frequent power control messaging (e.g., a power control message transmitted in each frame) in these communication systems permits a tight control of power output during communication. In satellite-based communication systems, the roundtrip times for communication signals traveling between a satellite transponder and a mobile communication unit typically exceed the roundtrip times associated with terrestrial-based communication signals. Within the span of the roundtrip time between the satellite transponder and the mobile communication unit, the CDMA 2000 and wideband CDMA systems transmit several or many power control messages, and this roundtrip time limits the response to such power control messages.

In view of the foregoing, it is desirable to provide a communication system that reduces bandwidth consumption for physical layer control messaging. In addition, it is desirable to provide a method for signaling control information in a communication system that minimally consumes bandwidth. In addition, it is desirable to provide a communication system for transmitting low rate control data that has a substantially wide variety of control content for the control data. Furthermore, other desirable features and characteristics of the present invention will become apparent from the subsequent detailed description and the appended claims, taken in conjunction with the accompanying drawings and this background of the invention.

BRIEF SUMMARY OF THE INVENTION

Systems and method are provided for signaling control information in a communication of data. In one exemplary embodiment, the method includes, but is not limited to, the steps of channel coding the data to form channel coded data, interleaving the channel coded data to form interleaved data, segmenting the interleaved data into a sequence of frames, and overwriting a portion of a frame in the sequence of frames with the control information. The control information has a low bit size of less than about twenty percent (20%) of the frame size, and the overwriting is performed at a frequency of less than about twenty percent (20%) of the frames in the sequence of frames.

In another exemplary embodiment, the system includes, but is not limited to, a spread spectrum transmitter for signaling control information in a communication of data. The spread spectrum transmitter includes, but is not limited to, a channel coder configured to apply forward error correction to the communication of data and produce channel coded data therefrom. In addition, the spread spectrum transmitter includes, but is not limited to, an interleaver and framer unit having an input coupled to the channel coder and having an output, and an insertion unit coupled to the output of the interleaver and framer unit. The interleaver and framer unit is configured to generate a sequence of frames from the channel coded data. The insertion unit is configured to overwrite a portion of a frame in the sequence of frames with the control information. The control information has a low bit size. The insertion unit is further configured to overwrite at a frequency of less than about twenty percent (20%) of the sequence of frames.

In yet another exemplary embodiment, the system includes a spread spectrum receiver for receiving a sequence of data frames. The spread spectrum receiver includes, but is not limited to, a correlator, a de-framer and de-interleaver unit having an input coupled to the correlator and also having an output, and a channel decoder coupled to the output of the de-framer and de-interleaver unit. The correlator is configured to detect a presence of a codeword, having codeword bits, in the sequence of data frames. The de-framer and de-interleaver unit is configured to distribute the codeword bits. The channel coder is configured to recover a low bit control message from the codeword bits. The low bit control message preferably appears in the sequence of data frames at a frequency of less than about twenty percent (20%) of the frames in the sequence of frames.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

Figure 1:
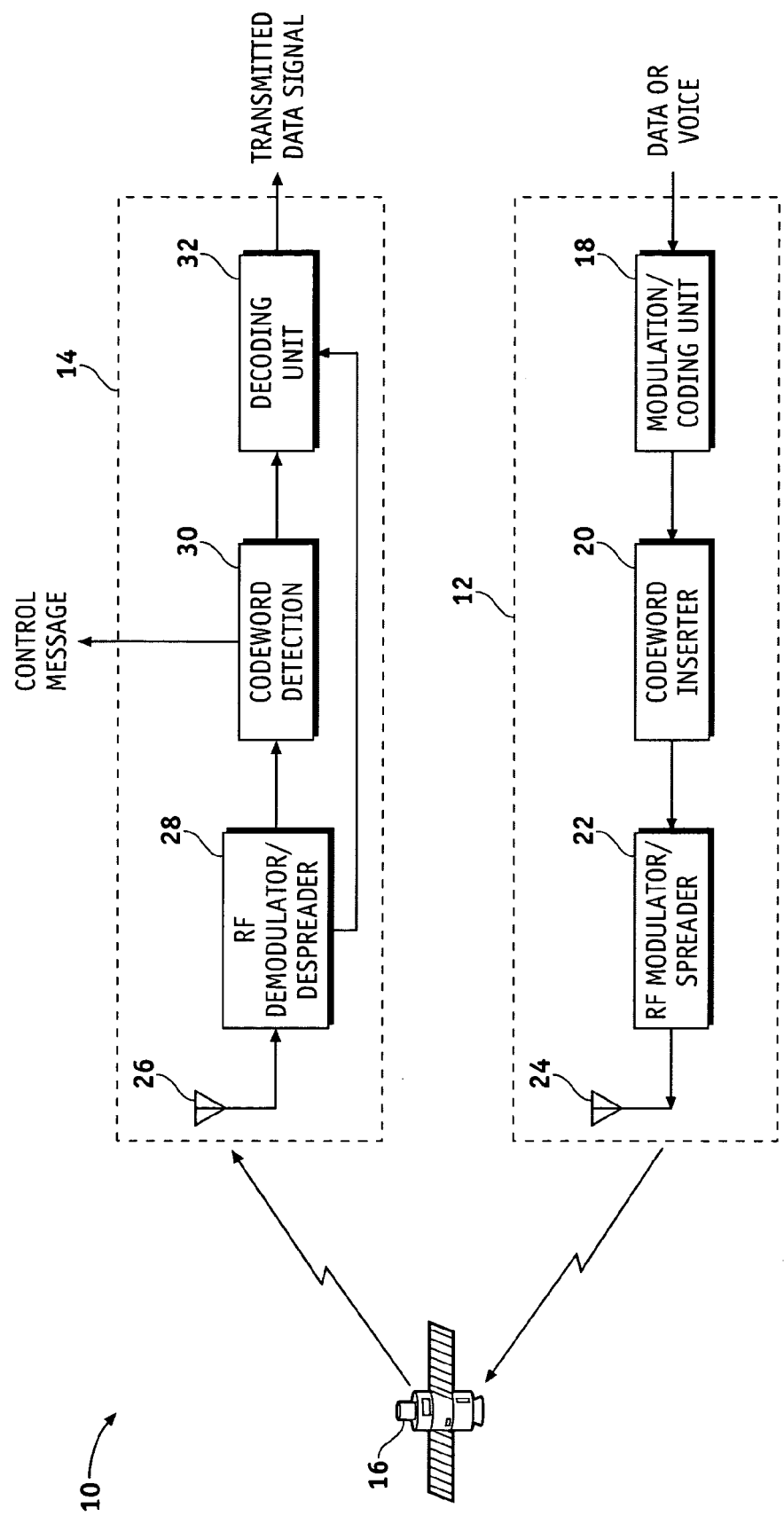
FIG. 1 is a block diagram of a communication system in accordance with an exemplary embodiment.

The following detailed description of the invention is merely exemplary in nature and is not intended to limit the invention or the application and uses of the invention. Furthermore, there is no intention to be bound by any theory presented in the preceding background of the invention or the following detailed description of the drawings.

A communication system and a method are provided for transmitting low rate data. Generally, the communication system includes, but is not limited to, a spread spectrum transmitter for signaling control information in a communication of data. The spread spectrum transmitter comprises a channel coder, an interleaver and framer unit coupled to the channel coder, and an insertion unit coupled to the interleaver and framer unit. The channel coder is configured to apply forward error correction to the communication of data and produce channel coded data therefrom. The interleaver and framer unit is configured to generate a sequence of frames from the channel coded data. The insertion unit is configured to overwrite a portion of a frame in the sequence of frames with the control information at a frequency of less than about twenty percent (20%) of the sequence of frames. The control information has a low bit size of less than about twenty percent (20%) of the frame size.

The communication system and subsequently described apparatus and methods, are preferably utilized in a wireless communication system such as a satellite communication system, cellular communication system or other Personal Communication Systems (PCS). However, as appreciated by one of ordinary skill in the art, the principles discussed herein are readily applied to other wireless based, radio, cable television (CATV), telephony as well as other data, voice, or a combination data and voice communications systems. Furthermore, as appreciated by one of ordinary skill in the art, the principles discussed herein are readily applied to systems separating the antenna from the processing system such as Radio Frequency (RF) monitoring and surveillance, direct finding, Radio Detection and Ranging (RADAR), and Sound Navigation and Ranging (SONAR).

The communication of data received at the channel coder, which are binary encoded analog waveforms that can be generated using digital signal processing techniques known to those of ordinary skill in the art, and which represent the reception of received analog signals that are digitally encoded, and/or modulated, spread, and/or a multiplexed set of information streams, can be any number of digital representations of modulated data waveforms, voice waveforms, combination of data and voice waveforms, samples portions or RF, acoustic or optical receivers, or radar waveforms. The present invention is applicable to digital communication signals in a variety of modulation and multiple access schemes based upon spread-spectrum communication, such as Code Division Multiple Access (CDMA), Frequency Division Multiple Access (FDMA), Time Division Multiple Access (TDMA), Third Generation Partnership Project (3GPP) Wideband Code Division Multiple Access (WCDMA) Direct Sequence Spread Spectrum (DSSS) signals containing multiple data and/or voice users using different spreading codes, or the like.

Although a spread spectrum system is described hereinafter with regard to corresponding hardware that accomplishes signal processing functions, the spread spectrum system may alternatively utilize software, such as found in software defined radios, that encompass applications, routines, or other software modules to accomplish signal processing functions. Those of skill in the relevant art will appreciate that other variations of hardware, software, or any combination thereof may be implemented to accomplish the same functions such as programmable microprocessors, field programmable gate arrays (FPGAs), or controllers.

Referring to FIG. 1, a communications system 10 is illustrated in accordance with an exemplary embodiment. It should be appreciated that the blocks of FIG. 1, as well as the blocks in the other block diagrams disclosed herein, represent functional elements and are not intended to represent discrete hardware elements. For example, in one exemplary embodiment of the invention, many of the functions illustrated in FIG. 1 are implemented in a single processor unit. As previously mentioned hereinabove, the functions can all be implemented in hardware, all in software, or a combination of hardware and software.

As shown in FIG. 1, the communication system 10 includes, but is not necessarily limited to, a transmitter 12, a receiver 14, and a transponder 16. Although the communication system 10 is shown to include a separated transmitter 12 and receiver 14, the transmitter 12 and receiver 14 may be combined together as a single unit such as found in wireless or mobile communication units (e.g., cellular phones, software defined radios, and the like). A data or speech source delivers a data signal to the transmitter 12 that processes the data and generates a transmit RF signal. The transponder 16 (e.g., a satellite transponder) receives the transmit signal and transmits a receive signal, and the receiver 14 receives and processes the receive signal to recover the original data (e.g., speech).

The transmitter 12 includes, but is not necessarily limited to, a modulation/coding unit 18 that prepares a sequence of data frames from the data signal, a codeword inserter 20 having an input coupled to the modulation/coding unit 18, a radio frequency (RF) modulator/spreader 22 having an input coupled to an output of the codeword inserter 20, and an antenna 24 coupled to an output of the RF modulator 22. The codeword inserter 20 produces a coded signal from the sequence of data frames, and the modulation/coding unit 18 converts the coded signal to the transmit RF signal. The modulation/coding unit 18 applies modulation and/or coding to the data as is familiar to those of skill in the art. For example, the modulation/coding unit 18 can apply source coding, channel coding, interleaving, and/or various forms of modulation to the data signal as well known in the art. In a spread spectrum system, the modulation/coding unit 18 applies signal spreading to the signal using conventional methods including, by way of example and not of limitation, direct sequence, frequency hopping, and the like. In an exemplary embodiment, the modulation/coding unit 18 includes a CDMA processor that codes and modulates packet data or voice signals to provide a CDMA spread signal.

When the transmitter 12 determines that a predetermined function is preferably controllable (e.g., power output and timing control), the codeword inserter 20 selectively overwrites a low rate control message or control information, onto a portion of the sequence of data frames from the modulation/coding unit 18 thus creating a coded signal that the RF modulator/spreader 22 up-converts from the codeword inserter 20 for RF transmission. The term "low rate" refers to a frequency of transmitting the control message within a communication that is less than about five-hundred (500) times/sec in a communication. In a communication system using framed data, the codeword inserter 20 overwrites the control message at a frequency of preferably less than about twenty percent (20%) of the frames of the communication (e.g., the coded signal), more preferably less than about ten percent (10%) of the frames of the communication, and most preferably less than about one percent (1%) of the frames of the communication. Thus, with these reduced overwriting frequencies, the control message appears in the transmitted communication at a low rate. Additionally, with a low bit size control message (e.g., less than about twenty (20) bits or less than about twenty percent (20%) of the frame size), the control message may be referred to as having a low bit rate based on overwriting the low bit size control message into the coded signal at these low overwriting frequencies.

The transmitter 12 may instruct the codeword inserter 20 to overwrite the sequence of data frames at even lower frequencies. For example, the transmitter 12 may instruct the codeword inserter 20 to overwrite the sequence of data frames at a rate of about once every 600-700 ms. The transmitter 12 also preferably has an option of instructing the codeword inserter 20 to overwrite a data frame, although the transmitter 12 may forego this option. In comparison with conventional CDMA communication systems, the codeword inserter overwrites the sequence of data frames at a frequency substantially lower than the periodically transmitted (e.g., each slot for wideband CDMA and each frame for CDMA 2000) power control bits in conventional CDMA communication systems. By overwriting the sequence of data frames into a portion of a frame at a frequency of less than about twenty percent (20%) of the frames in a communication, the transmitter 12 operates with a reduced bit error rate.

In an exemplary embodiment, the control message has a predetermined bit length (e.g., ten (10) bits) and provides a number of different instructions for a variety of communication controls. The control message may, indicate power control, frequency control, timing control, and the like, to a receiving device, such as a cellular phone, and a different control message may be selected for a desired communication control. For example, a first control message may instruct an increase in the transmission power level by about two (2) dB, a second control message may instruct an increase in the transmission power level by about four (4) dB, a third control message may instruct a decrease in the transmission power level by about twenty-five hundredths (0.25) dB, and so on.

In an alternative embodiment, the control message has a variable bit length, and the variable bit length is set by the message type, for example, a power control message or a frequency control message. The variable bit length may also be set by a length-indicating field in the control message or by a form of message start/stop indicator, such as a contained in a short pattern of bits.

In one exemplary embodiment, the codeword inserter 20 divides the control message into an integer number of words, each preferably five (5)-bits in length, and maps, or indexes, each of the words to a codeword. For example, the codeword inserter 20 may divide a ten (10)-bit control message into two five (5)-bit words and map each of the five (5)-bit words to a fifteen (15)-bit codeword. If the control message length is not a multiple of five (5), additional bits may be added to pad the words to a five (5)-bit length. Although the codewords and words of the control message are described with respect to particular bit lengths, other bit lengths may be used in accordance with the present invention.

The codewords are preferably generated by selecting a linear feedback shift register configured to produce a maximal length sequence or m-sequence where the length of the sequence (n) corresponds to the size of a codeword. In one exemplary embodiment, the codeword inserter 20 generates a first sequence having the selected maximal length to produce a first codeword, generates the next codeword by cyclically shifting the bit sequence of the first codeword by one bit, generating the next n−2 codewords by successive cyclic one bit shifts, generating the n+1th codeword by selecting all bits in the sequence as zeros, generating an n+2th codeword by inverting every bit in the sequence of the first codeword, and generating the next n codewords by inverting the bits of the second codeword through the n+1th codeword. For a maximal bit sequence length example of fifteen (15) bits, the codeword inserter 20 generates a first sequence of fifteen (15) bits as the first codeword, cyclically shifts the bit sequence of the first codeword by one bit to produce the second codeword, generates the next thirteen (13) codewords by cyclically shifting each successive sequence by one bit, generates the sixteenth codeword by selecting all bits in the sequence as zeros, generates the seventeenth codeword by inverting every bit in the sequence of the first codeword, and generates the next fifteen (15) codewords by inverting the bits of each of the second through sixteenth codewords. In this example, the codeword inserter 20 generates thirty-two (32) codewords for a fifteen (15)-bit sequence maximal length.

In one exemplary embodiment, the codeword inserter 20 overwrites the sequence of data frames into one or more predetermined positions of the sequence of data frames from the modulation/coding unit 18. For example, the transmitter 12 may designate one or more specific frame numbers as possible positions for overwriting the sequence of data frames, and these specific frame numbers are provided to the receiver 14 via the communication or stored by the receiver 14 for recall during signal reception.

The receiver 14 includes, but is not necessarily limited to, an antenna 26 for receiving signals, an RF demodulator/despreader 28 having an input coupled to the antenna 26, a codeword detection unit 30 having an input coupled to a first output of the RF demodulator/despreader 28, and a decoding unit 32 coupled to an output of the codeword detection unit 30 and a second output of the RF demodulator/despreader 28. The RF demodulator/despreader 28 down-converts and despreads a received signal to a Forward Error Correction (FEC) encoded bit stream. The codeword detection unit 30 searches for codewords by applying conventional correlation algorithms to the FEC encoded bit stream. As indicated by the name, the decoding unit 32 decodes the FEC encoded bit stream to recover the transmitted data signal (e.g., data or speech). For example, the decoding unit 32 may apply source de-coding, channel de-coding, and de-interleaving to recover the original data signal. In one exemplary embodiment, the RF demodulator/despreader 28 performs a standardized CDMA baseband process to extract an FEC encoded data signal corresponding to the originally transmitted data signal. Additional components may be included within the receiver 14, such as an interference processor for conducting interference cancellation, as appreciated by those of skill in the art.

The codeword detection unit 30 correlates the FEC encoded bit stream with the possible codewords (e.g. one or more of the thirty-two (32) codewords for a fifteen (15)-bit length codeword sequence) and detects the presence of a codeword when the correlation output exceeds a predetermined threshold indicating the presence of the codeword. For the fifteen (15)-bit codeword length, a cross-correlation of the codeword produces one of +1, −1, and −15, and a correlation of +15 indicates the presence of a codeword, for example. Selecting the threshold of the correlation output to less than the codeword length (e.g., 15 bits), the codeword detection unit 30 may detect codewords that possibly contain bit errors. For example, by selecting the threshold of the correlation output as thirteen (13) during detection for a fifteen (15)-bit codeword, the codeword detection unit 30 detects the codeword with potential for a two (2) bit error. Upon detection of a codeword, the correlation indicates which codeword corresponds to the bit sequence, and the codeword detection unit 30 inverse maps the codeword to produce one or more words of the original control message.

In an exemplary embodiment, the codeword detection unit 30 provides an indication of the detection of a codeword to the decoding unit 32. The decoding unit 32 uses this indication to mark the overwritten bits, corresponding to the detected codeword, as unreliable prior to the FEC decoding. Marking these overwritten bits as unreliable generally improves the bit error rate performance of the FEC decoding when compared to processing these overwritten bits with reliability based upon the demodulated signal.

Where the transmitter 12 instructs the codeword inserter 20 to overwrite the control message at predetermined positions (e.g., at one or more predetermined frame numbers), the codeword detection unit 30 may limit searches to such predetermined positions. For example, in a frame-based communication signal, the receiver 14 feeds the bits within the frames associated with the predetermined positions of the control message to the codeword detection unit 30. As previously mentioned, the specific frames that possibly contain the control message may be set forth in the communication (e.g., in a header packet of a frame) received by the receiver 14, configured as part of a signal processing algorithm performed by the receiver 14, or predetermined by other conventional methods.

Figure 2:
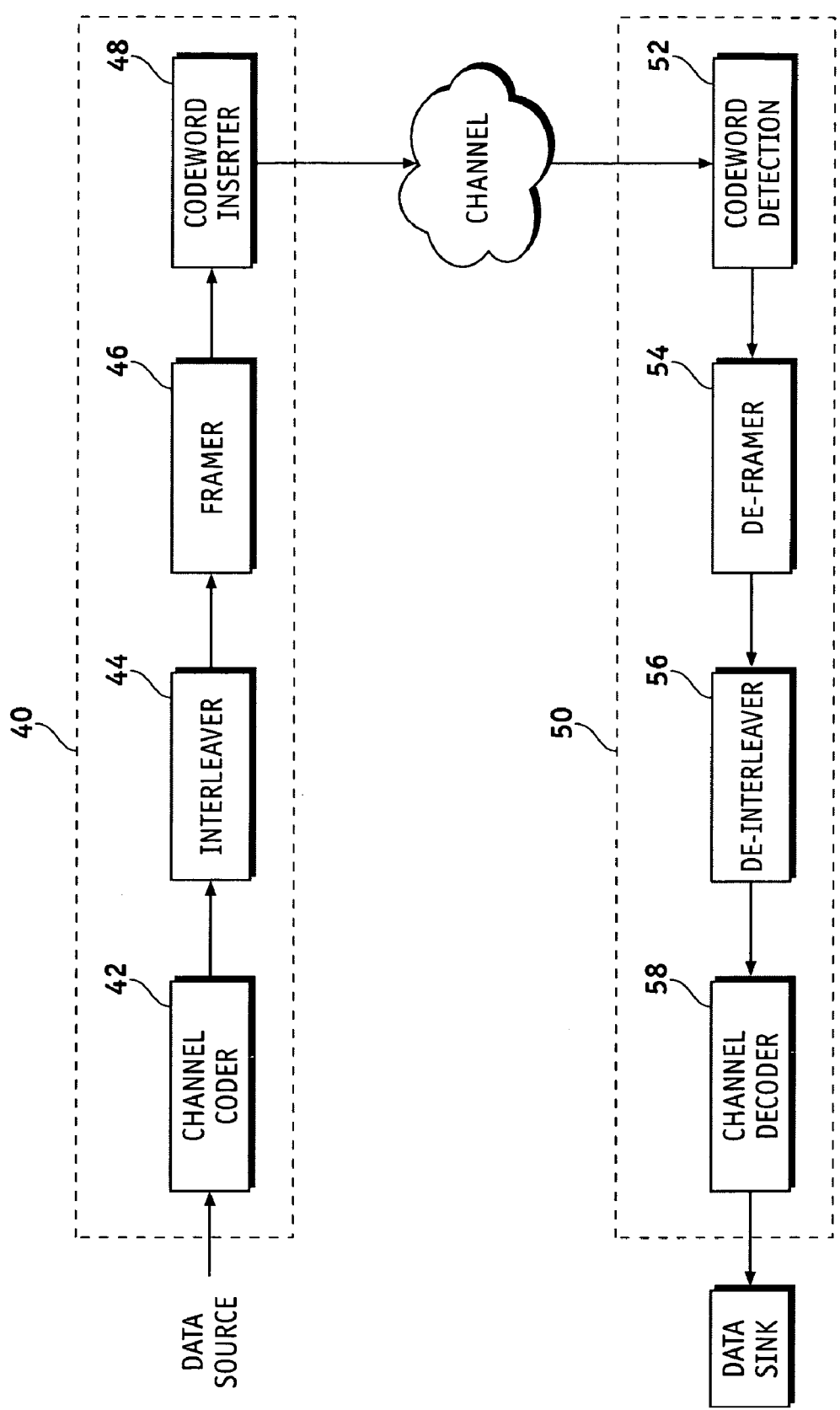
FIG. 2 is a functional block diagram illustrating communication between a transmitter and a receiver in accordance with an exemplary embodiment.

FIG. 2 is a functional block diagram illustrating communication between a transmitter 40, such as the transmitter 12 shown in FIG. 1, and a receiver 50, such as the receiver 14 shown in FIG. 1, in accordance with an exemplary embodiment. For purposes of simplification, the communication is described with respect to a single channel of communication although multiple communication signals may be transmitted and received on multiple channels. The transmitter 40 processes the data signal from a data source to produce a CDMA signal having a control message inserted therein and transmits the CDMA signal as part of a spread frequency spectrum.

The transmitter 40 includes, but is not necessarily limited to, a channel coder 42 having an input configured to receive a digitized data signal from a data source and having an output, an interleaver 44 having an input coupled to the output of the channel coder 42, a framer 46 having an input coupled to an output of the interleaver 44, and a codeword inserter 48, such as the codeword inserter 20 shown in FIG. 1, having an input coupled to an output of the framer 46. The channel coder 42 applies forward error correction coding to the digitized data signal to produce a coded signal. For example, cyclical redundancy check bits, or a check sum, may be applied to the digitized data signal and then a convolutional, turbo, block, or other conventional FEC technique may optionally be applied. The interleaver 44 interleaves the coded signal to produce an interleaved signal with an interleaving depth spanning over an integer multiple of a frame period. The interleaving scheme may be determined at a call set-up based on an actual data rate of the digitized data signal. The framer 46 segments the interleaved signal to produce a sequence of data frames. Data frames provide a marker for tracking the received data at the receiver 50 and organize the communication into uniformly sized groups of bits. Although the interleaver 44 and the framer 46 are separately shown in FIG. 2 and described as individual components of the transmitter 40, the interleaver 44 and the framer 46 may be combined into a single component that performs the respective functions.

As previously mentioned, the codeword inserter 48 overwrites a low rate control message into a portion of the sequence of data frames. For example, in a satellite communication, the codeword inserter 48 has the option of overwriting the sequence of data frames at a frequency that accommodates the time for a communication signal to travel roundtrip between a terrestrial communication unit and the satellite transponder (e.g., one frame out of seven-hundred (700) frames).

The receiver 50 includes, but is not necessarily limited to, a codeword detection unit 52, such as the codeword detection unit 30 shown in FIG. 1, having an input configured to receive a demodulated spread frequency spectrum, a de-framer 54 having an input coupled to an output of the codeword detection unit 30, a de-interleaver 56 having an input coupled to an output of the de-framer 54, and a channel decoder 58 having an input coupled to an output of the de-interleaver 56. As previously mentioned, the codeword detection unit 52 searches for the presence of one or more codewords in the FEC encoded bit stream, and the codewords indicate the control message. The de-framer 54 reassembles the sequence of frames from the spread frequency spectrum. Each frame has a frame marker and/or midamble indicating the start of valid data within the frame, or the frame boundary may be determined via a secondary synchronization channel. The de-interleaver redistributes the bits of the sequence of frames in a reverse operation of the interleaver 44. The channel decoder 58 recovers the original data bits such as by applying an inverse coding of coding applied by the channel coder 42.

Figure 3:
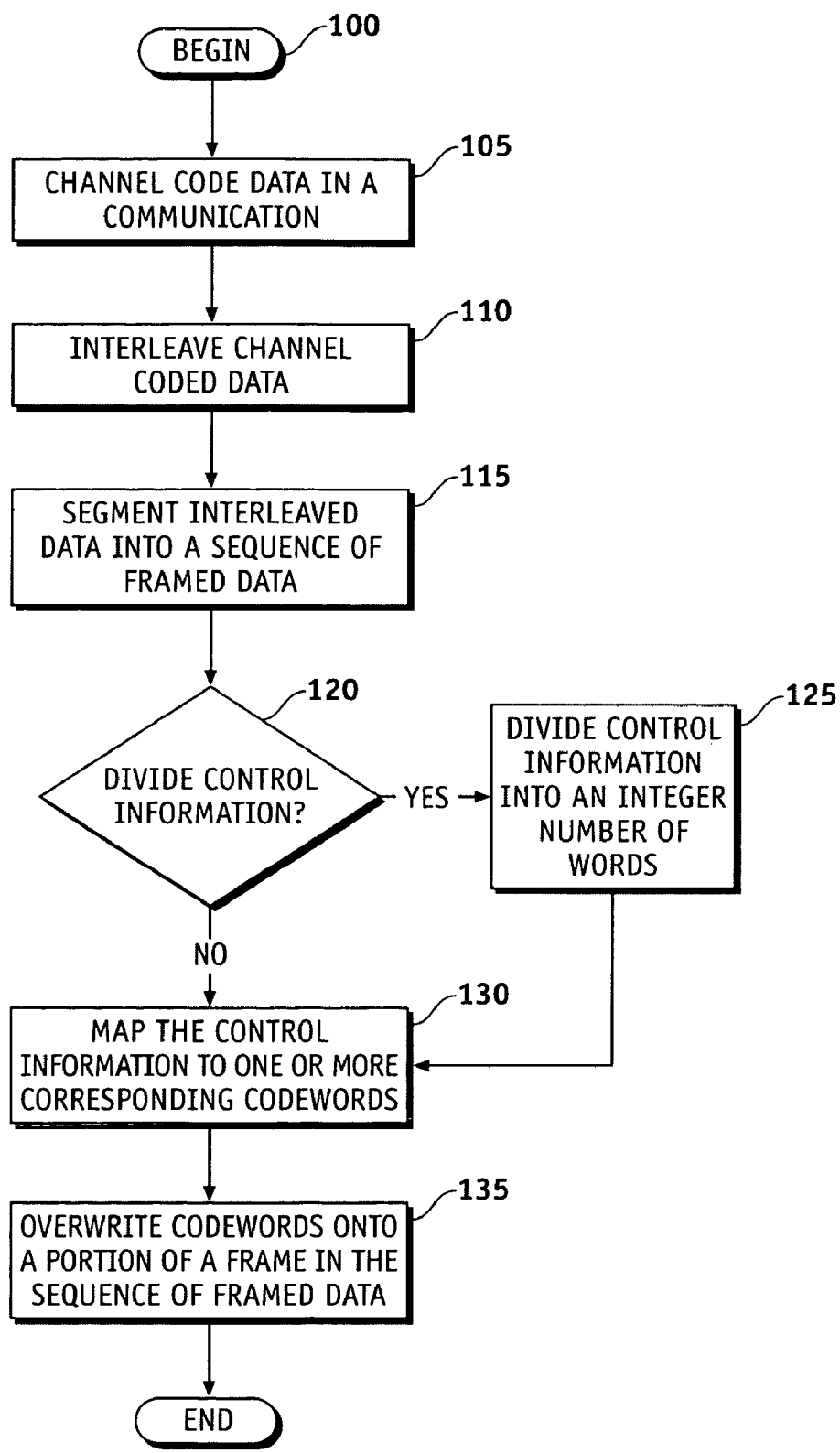
FIG. 3 is a flow diagram showing signaling of control information in a communication of data.

FIG. 3 is a flow diagram showing signaling of control information in a communication of data. The method begins at step 100. The channel coder 58 as shown in FIG. 2 applies forward error correction coding to the data of the communication to form channel coded data at step 105.

The interleaver 44 as shown in FIG. 2 interleaves the channel coded data from the channel coder 58 (FIG. 2) to form interleaved data at step 110. Conventional interleaving techniques may be used with an interleaving depth spanning over an integer multiple of a frame period. The interleaving scheme may be determined during a call set-up based on an actual data rate of the channel coded data. The framer 46 as shown in FIG. 2 segments the interleaved data from the interleaver 44 as shown in FIG. 2 into a sequence of frames at step 115.

The transmitter 40 as shown in FIG. 2 determines whether to divide the control information into two or more words at step 120. In the event the control information has a smaller bit sequence, the transmitter 40 as shown in FIG. 2 may retain the bit sequence of the control information for further processing. In the event the control information exceeds a predetermined bit length, the transmitter 40 as shown in FIG. 2 instructs the codeword inserter 48 as shown in FIG. 2 to divide the bit sequence of the control information into an integer number of words a step 125.

The codeword inserter 48 as shown in FIG. 2 maps or indexes the control information to one or more codewords from a predetermined list of codewords at step 130. Where the control information is divided into words, each of the words of the control information is mapped to a corresponding codeword. The codeword inserter 48 as shown in FIG. 2 overwrites a portion of a frame in the sequence of frames from the framer 46 (FIG. 2) with the control information at step 135 and overwrites the control information at a frequency of less than about twenty percent (20%) of the frames in the sequence of frames. The codeword inserter 48 as shown in FIG. 2 may also overwrite the control information into predetermined positions in the sequence of frames. The control information has a relatively low bit size (e.g., ten (10) bits), and the codeword inserter 48 as shown in FIG. 2 converts the control information to at least one codeword prior to overwriting. To convert the control information, the codeword inserter 48 as shown in FIG. 2 generates multiple of codewords, and indexes the control information to at least one codeword of the multiple codewords. In an exemplary embodiment, the codeword inserter 48 as shown in FIG. 2 selects a maximal length sequence n, where n is an integer, and generates 2n+2 sequences. Each of the sequences has an n bit length (e.g., fifteen (15) bits) and indicates one codeword out of the plurality of codewords.

The invented method and apparatus present significant benefits that would be apparent to one of ordinary skill in the art. While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method for signaling control information in a communication of data, the method comprising the steps of:
    channel coding the data to form channel coded data;
    interleaving the channel coded data to form interleaved data;
    segmenting the interleaved data into a sequence of frames;
    converting control information which has a low bit size to at least one codeword by generating a plurality of codewords and indexing the control information, wherein generating the plurality of codewords includes
        selecting a maximal length sequence n, where n is an integer, and
        generating 2n+2 sequences, each of the sequences having n bit length and indicating one codeword of the plurality of codewords, and wherein indexing the control information includes indexing the control information to at least one codeword of the plurality of codewords; and
    overwriting a portion of a frame in the sequence of frames with the control information, wherein said overwriting step is performed for a number of frames in the sequence of frames that is less than about 20% of the frames in the sequence of frames.

2. A method for signaling control information according to claim 1, wherein said overwriting step comprises overwriting the at least one codeword at a predetermined position in the frame.

3. A method for signaling control information according to claim 1, wherein the control information has a size of about 10 bits; and
    wherein the at least one codeword has a size of about 15 bits.

4. A spread spectrum transmitter for signaling control information in a communication of data, the spread spectrum transmitter comprising:
    a channel coder configured to apply forward error correction to the communication of data and produce channel coded data therefrom;
    an interleaver and framer unit having an input coupled to said channel coder and having an output, said interleaver and framer unit configured to generate a sequence of frames from the channel coded data;
    an insertion unit coupled to said output of said interleaver and framer unit and configured to overwrite a portion of a frame in the sequence of frames with the control information, the control information having a low bit size, said insertion unit further configured to overwrite a number of frames in the sequence of frames that is less than about 20% of the frames in said sequence of frames, and to map the control information to at least one codeword of a plurality of codewords; and
    a codeword generator configured:
        to generate the plurality of codewords,
        to select a maximal length sequence n, where n is an integer, and
        to generate 2n+2 bit sequences, each of the bit sequences having n bit length and indicating one codeword of the plurality of codewords.

5. A spread spectrum transmitter according to claim 4, wherein the control information has a first bit size;
    wherein each of said plurality of codewords has a second bit size; and
    wherein said insertion unit is further configured to:

partition the control information into an integer number of words; and map each of said integer number of words to one codeword of said plurality of codewords.

6. A spread spectrum transmitted according to claim 5, wherein said second bit size is about 15 bits; and wherein each of said integer number of words has a third bit size of about 5 bits.

7. A spread spectrum transmitter according to claim 4, wherein said insertion unit is further configured to overwrite the control information at a predetermined position in said frame of said sequence of frames.

8. A spread spectrum receiver for receiving a sequence of data frames, the spread spectrum receiver comprising:

a correlator configured:

to compare the sequence of data frames with a codeword of a predetermined set of codewords to generate a correlation output, said codeword having codeword bits, and to detect said codeword in the sequence of data frames when said correlation output exceeds a predetermined threshold;

a de-framer and de-interleaver unit having an input coupled to said correlator and having an output, said de-framer and de-interleaver unit configured to distribute said codeword bits; and a channel decoder coupled to said output of said de-framer and de-interleaver unit and configured to recover a low bit control message from said codeword bits, said low bit control message appearing in a number of frames in the sequence of data frames that is less than about 20% of the frames of the sequence of frames, wherein said predetermined set of codewords comprises 2n+2 bit sequences, each of said 2n+2 bit sequences indicating a codeword of said predetermined set of codewords and having an n bit length, and wherein n is an integer.

9. A spread spectrum receiver according to claim 8, wherein said low bit control message has a bit size of less than about 20 bits.

* * * * *